United States Patent  
Young et al.

(10) Patent No.: US 12,185,701 B2
(45) Date of Patent: *Jan. 7, 2025

(54) SELF-CALIBRATING ULTRASONIC REMOVAL OF ECTOPARASITES FROM FISH

(71) Applicant: TidalX AI Inc., San Ramon, CA (US)

(72) Inventors: Grace Calvert Young, Mountain View, CA (US); Matthew Aaron Knoll, Mountain View, CA (US); Bryce Jason Remesch, San Jose, CA (US); Peter Kimball, Mountain View, CA (US)

(73) Assignee: TidalX AI Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/319,246

(22) Filed: May 17, 2023

(65) Prior Publication Data

US 2024/0130334 A1 Apr. 25, 2024
US 2024/0224952 A9 Jul. 11, 2024

Related U.S. Application Data

(63) Continuation of application No. 17/971,503, filed on Oct. 21, 2022, now Pat. No. 11,690,359, which is a
(Continued)

(51) Int. Cl.
*A01K 61/13* (2017.01)
*A01M 29/18* (2011.01)
(Continued)

(52) U.S. Cl.
CPC ............ *A01K 61/13* (2017.01); *A01M 29/18* (2013.01); *G01N 29/00* (2013.01); *G06V 40/10* (2022.01);
(Continued)

(58) Field of Classification Search
CPC .... A10K 61/13; H04R 2217/03; G06V 40/00; G06T 7/00; G06T 7/0012; G01N 29/34;
(Continued)

(56) References Cited

U.S. PATENT DOCUMENTS 7,393,323 B2 7/2008 Vago
7,377,905 B2 8/2008 Vago
(Continued)

FOREIGN PATENT DOCUMENTS

CA 2859955 A1 * 6/2013 ............. A01K 61/13
CA 3045347 A1 * 6/2018 ............. A01K 61/13
(Continued)

OTHER PUBLICATIONS

Extended Search Report in European Appln. No. 22151132.2, dated May 2, 2022, 10 pages.
(Continued)

*Primary Examiner* — John E Breene
*Assistant Examiner* — Rose M Miller
(74) *Attorney, Agent, or Firm* — Fish & Richardson P.C.

(57) ABSTRACT

Methods, systems, and apparatus, including computer programs encoded on computer-storage media, for self-calibrating ultrasonic removal of sea lice. In some implementations, a method includes generating, by transducers distributed in a sea lice treatment station, a first set of ultrasonic signals, detecting a second set of ultrasonic signals in response to propagation of the first set of ultrasonic signals through water, determining propagation parameters of the sea lice treatment station based on the second set of ultrasonic signals that were detected, obtaining an image of a sea louse on a fish in the sea lice treatment station, determining, from the image, a location of the sea louse in the sea lice treatment station, and generating a third set of ultrasonic signals that focuses energy at the sea louse.

20 Claims, 5 Drawing Sheets

Related U.S. Application Data continuation of application No. 17/132,874, filed on Dec. 23, 2020, now Pat. No. 11,490,601.

(51) Int. Cl.
  *G01N 29/00* (2006.01)
  *G01N 29/34* (2006.01)
  *G06T 7/00* (2017.01)
  *G06V 40/10* (2022.01)
  *G01N 29/36* (2006.01)
  *G01N 29/44* (2006.01)

(52) U.S. Cl.
  CPC ............ *G01N 29/34* (2013.01); *G01N 29/36* (2013.01); *G01N 29/44* (2013.01); *G06T 7/00* (2013.01); *H04R 2217/03* (2013.01)

(58) Field of Classification Search
  CPC ........ G01N 29/36; G01N 29/44; G01N 29/00; A01M 29/18
  USPC .......................................... 119/215; 382/110
  See application file for complete search history.

(56) References Cited

U.S. PATENT DOCUMENTS

| | | | |
|---|---|---|---|
| 7,413,552 B2 | 8/2008 | Vago | |
| 9,072,281 B2 | 7/2015 | Beck | |
| 10,849,317 B2 | 12/2020 | Alevy | |
| 10,856,520 B1 | 12/2020 | Kozachenok et al. | |
| 11,490,601 B2 | 11/2022 | Young | |
| 11,690,359 B2 * | 7/2023 | Young .................... | G01N 29/00 382/110 |
| 2017/0094950 A1 * | 4/2017 | Alevy .................... | A01K 61/13 |
| 2017/0150701 A1 | 6/2017 | Gilmore et al. | |
| 2019/0228218 A1 | 7/2019 | Barnaby et al. | |
| 2019/0340440 A1 | 11/2019 | Atwater et al. | |
| 2020/0107524 A1 | 4/2020 | Messana et al. | |
| 2020/0155882 A1 | 5/2020 | Tohidi et al. | |
| 2020/0288678 A1 | 9/2020 | Howe et al. | |
| 2023/0067723 A1 * | 3/2023 | Young .................. | G05B 19/042 |
| 2023/0189766 A1 * | 6/2023 | Young .................... | A01K 61/10 119/215 |

FOREIGN PATENT DOCUMENTS

| | | | | |
|---|---|---|---|---|
| CL | 2019000039 A1 | | 3/2019 | |
| CN | 108040948 | | 5/2018 | |
| EP | 2244934 | | 11/2010 | |
| EP | 2962556 | | 1/2016 | |
| EP | 3484283 | | 5/2019 | |
| EP | 3346850 | | 9/2020 | |
| GB | 2309621 | | 8/1997 | |
| GB | 2584166 A | * | 11/2020 | ............ A01K 61/13 |
| JP | 2002171853 | | 6/2002 | |
| JP | 2013518583 | | 5/2013 | |
| NO | 300401 | | 5/1997 | |
| NO | 20160199 | | 8/2017 | |
| WO | WO-90007574 | * | 7/1990 | ............ A01K 61/13 |
| WO | WO-9417657 A1 | * | 8/1994 | ............ A01K 61/00 |
| WO | WO-97019857 | * | 6/1997 | ............ A01K 13/003 |
| WO | WO 2009/008733 | | 1/2009 | |
| WO | WO 2009/097057 | | 8/2009 | |
| WO | WO 2011/115496 | | 9/2011 | |
| WO | WO 2012/081990 | | 6/2012 | |
| WO | WO 2013/095153 | | 6/2013 | |
| WO | WO 2014/179482 | | 11/2014 | |
| WO | WO 2017/044985 | | 3/2017 | |
| WO | WO 2017/137896 | | 8/2017 | |
| WO | WO 2018/011744 | | 1/2018 | |
| WO | WO 2018/011745 | | 1/2018 | |
| WO | WO 2018/115826 | | 6/2018 | |
| WO | WO 2019/002881 | | 1/2019 | |
| WO | WO 2019/121851 | | 6/2019 | |
| WO | WO 2019/121900 | | 6/2019 | |
| WO | WO 2019/188506 | | 10/2019 | |
| WO | WO 2019/232247 | | 12/2019 | |
| WO | WO 2019/245722 | | 12/2019 | |
| WO | WO 2020/046524 | | 3/2020 | |
| WO | WO 2020/048945 | | 3/2020 | |
| WO | WO 2020/132031 | | 6/2020 | |
| WO | WO 2021/006744 | | 1/2021 | |
| WO | WO 2021/030237 | | 2/2021 | |
| WO | WO 2021/188292 | | 9/2021 | |
| WO | WO 2022/010815 | | 1/2022 | |
| WO | WO 2020/072438 | | 4/2022 | |

OTHER PUBLICATIONS

[No Author Listed], "2020 The State of World Fisheries and Aquaculture," Food and Agriculture Organization of the United Nations, 2020, 224 pages.

Aunsmo et al., "Accuracy and precision of harvest stock estimation in Atlantic salmon farming," Aquaculture, Mar. 2013, 369(399):113-118.

Aunsmo et al., "Field validation of growth models used in Atlantic salmon farming," Aquaculture, Mar. 2014, 428(429):249-257.

Bani et al., "Histological and ultrastructural effects of ultrasound-induced cavitation on human skin adipose tissue," Plastic and Reconstructive Surgery Global Open, Sep. 2013, 1(6).

Boldt et al., "Development of stereo camera methodologies to improve pelagic fish biomass estimates and inform ecosystem management in marine waters," Fisheries Research, 2018, 198:66-77.

Bravo et al., "Coinfection of Caligus lalandei and Benedenia seriolae on the yellowtail kingfish Seriola lalandi farmed in a net cage in northern Chile," Latin american journal of aquatic research, 2017, 45(4):852-7.

Costello et al., "The future of food from the sea, " Nature, Dec. 2020, 588:95-100.

Crippa et al., "Food systems are responsible for a third of global anthropogenic GHG emissions," Nature Food, Mar. 2021, 2:198-209.

fishfarmingexpert.com [online], "Turning ultrasound and infrared on sea lice," Dec. 13, 2017, retrieved on Aug. 1, 2022, retrieved from URL<https://www.fishfarmingexpert.com/article/a-lethal-bubble-bath-for-sea-lice/>, 12 pages.

Flickr.com [online], "Anatomy of *Caligus* sp.," Apr. 2008, retrieved on Feb. 8, 2021, retrieved from URL<https://www.flickr.com/photos/herrymazelan/2415409773>, 1 page.

Fore et al., "Precision fish farming: A new framework to improve production in aquaculture," Biosystems Engineering, Nov. 2017, 173:176-193.

Fry et al., "Feed conversion efficiency in aquaculture: do we measure it correctly?," Environ. Res. Lett., Feb. 2018, 13:024017.

Harvey et al., "The accuracy and precision of underwater measurements of length and maximum body depth of southern bluefin tuna (*Thunnus maccoyii*) with a stereo-video camera system," Fisheries Research, Sep. 2003, 63(3):315-326.

Hilborn et al., "The environmental cost of animal source foods," Front Ecol Environ, 2018, 16(6):329-335.

Hockaday et al., "Using truss networks to estimate the biomass of Oreochromis niloticus, and to investigate shape characteristics," Journal of Fish Biology, May 2000, 57:981-1000.

International Preliminary Report on Patentability in International Appln. No. PCT/US2020/059829, dated May 27, 2022, 11 pages.

International Search Report and Written Opinion in International Appln. No. PCT/US2022/018651, dated Jun. 22, 2022, 14 pages.

International Search Report and Written Opinion in International Appln. No. PCT/US2022/021683, dated Jun. 27, 2022, 14 pages.

International Search Report and Written Opinion in International Appln No. PCT/US2022/022250, dated Jul. 6, 2022, 15 pages.

International Search Report and Written Opinion in International Appln No. PCT/US2022/022492, dated Jun. 28, 2022, 13 pages.

International Search Report and Written Opinion in International Appln No. PCT/US2022/022589, dated Jul. 7, 2022, 12 pages.

(56) References Cited

OTHER PUBLICATIONS

International Search Report and Written Opinion in International Appln No. PCT/US2022/022837, dated Aug. 2, 2022, 14 pages.
International Search Report and Written Opinion in International Appln No. PCT/US2022/023831, dated Jul. 8, 2022, 13 pages.
International Search Report and Written Opinion in International Appln. No. PCT/US2020/059829, dated Feb. 25, 2021, 18 pages.
International Search Report and Written Opinion in International Appln. No. PCT/US2021/057576, dated Feb. 3, 2022, 15 pages.
International Search Report and Written Opinion in International Appln. No. PCT/US2022/036772, dated Nov. 22, 2022, 15 pages.
IntraFish.com [online], "Belgian, Norwegian companies join forces to battle salmon farming's sea lice scourge," Sep. 30, 2019, retrieved on Jun. 17, 2022, retrieved from URL<https://www.intrafish.com/aquaculture/belgian-norwegian-companies-join-forces-to-battle-salmon-farmings-sea-lice-scourge/2-1-680106>, 1 page.
Kang et al., "A Study on the Search of Optimal Aquaculture farm condition based on Machine Learning," The Journal of The Institute of Internet, Broadcasting and Communication, Apr. 2017, 17(2):135-140.
Macleod et al., "Quantifying and mitigating greenhouse gas emissions from global aquaculture," FAO Fisheries and Aquaculture Technical Paper, Mar. 2019, 626:50 pages.
Maloy et al., "A spatio-temporal recurrent network for salmon feeding action recognition from underwater videos in aquaculture," Computers and Electronics in Agriculture, Nov. 12, 2019, 9 pages.
MarineSpecies.org [online], "Benedenia seriolae," 1934, retrieved on Feb. 8, 2021, retrieved from URL<http://www.marinespecies.org/aphia.php?p=taxdetails&id=414341>, 3 pages.
Meidell et al., "FishNet: A Unified Embedding for Salmon Recognition," Thesis for Master's degree in Artificial Intelligence, Norwegian University of Science and Technology, Jun. 2019, 86 pages.
Moskvyak et al., "Robust Re-identification of Manta Rays from Natural Markings by Learning Pose Invariant Embeddings," CoRR, Feb. 2019, arXiv:1902.10847v1, 12 pages.
Murray et al., "Using the H-index to assess disease priorities for salmon aquaculture," Preventive Veterinary Medicine, Apr. 2016, 126:199-207.
Odey, "AquaMesh—Design and Implementation of Smart Wireless Mesh Sensor Networks for Aquaculture," American Journal of Networks and Communications, Jul. 2013, 8 pages.
Parker et al., "Fuel use and greenhouse gas emissions of world fisheries," Nature Climate Change, Apr. 2018, 8:333-337.
PCT International Search Report and Written Opinion in International Appln. No. PCT/US2020/059829, dated Feb. 25, 2021, 18 pages.
PCT International Search Report and Written Opinion in International Appln. No. PCT/US2021/020460, dated Jun. 16, 2021, 13 pages.
Pérez et al., "Automatic measurement of fish size using stereo vision," 2018 IEEE International Instrumentation and Measurement Technology Conference, May 2018, 6 pages.
Petrov et al., "Overview of the application of computer vision technology in fish farming," E3S Web of Conferences, 2020, 175:02015.
Pettersen et al., "Detection and classification of lepeophterius salmonis (krøyer, 1837) using underwater hyperspectral imaging," Aquacultural Engineering, Nov. 2019, 87:102025.
Qiu et al., "Improving Transfer Learning and Squeeze-and-Excitation Networks for Small-Scale Fine-Grained Fish Image Classification," IEEE Access, Dec. 2018, 6(31):78503-78512.
Rahman et al., "Developing an Ensembled Machine Learning Prediction Model for Marine Fish and Aquaculture Production," Sustainability, 2021, 13:9124.
Saberloon et al., "Application of Machine Vision Systems in Aquaculture with Emphasis on Fish: State-of-the-Art and Key Issues," Reviews in Aquaculture, Dec. 2017, 9:369-387.
Shafait et al., "Towards automating underwater measurement of fish length: a comparison of semi-automatic and manual stereovideo measurements," ICES Journal of Marine Science, 2017, 12 pages.
Sintef.no [online], "Jumping salmon removes lice," Nov. 23, 2011, retrieved on Jun. 17, 2022, retrieved from URL<https://www.sintef.no/en/latest-news/2011/jumping-salmon-removes-lice/>, 9 pages.
Stein et al., "Consistent melanophore spot patterns allow long-term individual recognition of Atlantic salmon Salmo Salar," Journal of Fish Biology, Nov. 2017, 91(6):1699-1712.
Svendsen et al., "Effect of ultrasonic cavitation on small and large organisms for water disinfection during fish transport," Aquaculture Research, Dec. 2017, 49(7):1166-1175.
thefishsite.com [online], "Turning ultrasound and infrared on sea lice," Nov. 23, 2020, retrieved on Aug. 1, 2022, retrieved from URL<https://thefishsite.com/articles/turning-ultrasound-and-infrared-on-sealice#:~:text=It%20has%20long%20been%20known,sea%20lice%20(Lepeophtheirus%20salmonis)>, 7 pages.
Topaz et al., "Possible long-term complications in ultrasound-assisted lipoplasty induced by sonoluminescence, sonochemistry, and thermal effect," Aesthetic surgery journal, Jan. 1998, 18(1):19-24.
towardsdatascience.com [online], "Analyzing Applications of Deep Learning in Aquaculture," Jan. 2021, retrieved on Aug. 11, 2021, retrieved from URL<https://towardsdatascience.com/analyzing-applications-of-deep-learning-in-aquaculture-7a273399553/>, 12 pages.
Troell et al., "Does aquaculture add resilience to the global food system?," PNAS, Sep. 2014, 111(37):13257-13263.
Wang et al., "Advances in low-frequency ultrasound combined with microbubbles in targeted tumor therapy," Journal of Zhejiang University—Science B, Apr. 2019, 20(4):291-9.
Wang, "Robust tracking of fish schools using CNN for head identification," Multimedia Tools and Applications, Nov. 2017, 20 pages.
www.era-learn.eu [online], "Project: Ultrasonic and physical elimination of Caligidae sea lice from salmon fish farms," May 11, 2018, retrieved on Aug. 1, 2022, retrieved from URL<https://www.era-learn.eu/network-information/networks/eurostars-2/eurostars-cut-off-8/ultrasonic-and-physical-elimination-of-caligidae-sea-lice-from-salmon-fish-farms>, 3 pages.
www.fishfarmermagazine.com [online], "GenusWave gives salmon a fighting chance against sea lice," Oct. 16, 2020, retrieved on Aug. 1, 2022, retrieved from URL<https://www.fishfarmermagazine.com/news/genuswave-gives-salmon-afighting-chance-against-sea-lice/>, 7 pages.
Yang et al., "Deep learning for smart fish farming: applications, opportunities and challenges," Reviews in Aquaculture, 2021, 13(1):66-90.
International Preliminary Report on Patentability in International Appln. No. PCT/US2021/057576, dated Jul. 6, 2023, 9 pages.
Office Action in European Appln. No. 21815040.7, dated Feb. 6, 2024, 6 pages.
Office Action in Japanese Appln. No. 2023-522379, dated Jun. 17, 2024, 6 pages (with English translation).
Office Action in Chilean Appln. No. 202301175, dated Sep. 30, 2024, 24 pages (with English translation).

* cited by examiner

SELF-CALIBRATING ULTRASONIC REMOVAL OF ECTOPARASITES FROM FISH

CROSS REFERENCE TO RELATED APPLICATION

This patent application is a continuation (and claims the benefit of priority under 35 USC 120) of U.S. patent application Ser. No. 17/971,503, filed Oct. 21, 2022, now U.S. Pat. No. 11,690,359, issued Jul. 4, 2023, which is a continuation of U.S. patent application Ser. No. 17/132,874, filed Dec. 23, 2020, now U.S. Pat. No. 11,490,601, issued Nov. 8, 2022. The disclosure of the prior applications are considered part of (and are incorporated by reference in) the disclosure of this application.

TECHNICAL FIELD

This specification relates to ultrasound devices that are used in the context of aquaculture.

BACKGROUND

Sea lice are parasites that can create significant problems for farmed fish. When sea lice attach themselves to fish, they feed on fish's natural mucus, which causes lesions to form. Such lesions may reduce the marketability of farmed fish, and can even cause farmed fish to die. Moreover, if sea lice are too plentiful on a farm, it can cause the farm to be required to shut down because of the effects on wild populations.

Sea lice may be extremely difficult to remove, as the sea lice are only a few millimeters long and may suction themselves very strongly onto the skin of fish. Removal can be even more difficult when sea lice embed themselves within the mucus of host fish or between fish scales.

SUMMARY

In general, innovative aspects of the subject matter described in this specification relate to a self-calibrating device that is used for the ultrasonic removal of parasites such as sea lice. Sea lice may be removed or loosened from fish using ultrasonic signals. For example, ultrasonic signals may be used to generate cavitation bubbles that form under and around sea lice, allowing water rushing past the fish and natural motion of fish to dislodge the lice. Ultrasonic signals, even without cavitation bubbles, may also traverse along sea lice to sweep the sea lice off fish. Additionally, ultrasonic signals may break a carapace of sea lice so that freshwater or another substance lethal only to the lice may penetrate and kill the sea lice, or damage/disable reproductive capability.

However, because ultrasonic signals could potentially damage or descale fish, the enhanced techniques described by this specification may specifically focus energy on sea lice instead of fish. Because targeting of ultrasonic signals may be difficult, as ultrasonic signals propagate differently in water based on many factors such as water temperature, water pressure, water chemistry, concentration of fish mucus, and concentration of excrement, repeated self-calibration by the device may enable more accurate targeting. For example, temperature changes alone may cause ultrasonic signals to converge at locations that are centimeters apart and a sea lice may only be millimeters long, so repeated self-calibration may allow the device to determine different ultrasonic signals that converge at a particular location that may be most effective for louse elimination as temperatures change.

To account for changes in propagation, a sea lice treatment station may use self-calibrating ultrasonic removal of sea lice. The sea lice treatment station may include many ultrasonic transducers that are distributed throughout the sea lice treatment station. The sea lice treatment station may continually perform self-calibration to determine propagation parameters that take into account how ultrasonic signals propagate through water within the sea lice treatment station at the moment of treatment. When the sea lice treatment station detects a sea louse on a fish, the sea lice treatment may use the propagation parameters to generate ultrasonic signals that focus energy at or near the sea louse. Accordingly, the sea lice treatment station may use ultrasonic signals to safely remove sea lice from fish.

One innovative aspect of the subject matter described in this specification is embodied in a method that includes generating, by ultrasonic transducers distributed in a sea lice treatment station, a first set of ultrasonic signals, detecting, by the ultrasonic transducers, a second set of ultrasonic signals in response to propagation of the first set of ultrasonic signals through water in the sea lice treatment station, determining propagation parameters of the sea lice treatment station based on the second set of ultrasonic signals that were detected, obtaining an image of a sea louse on a fish in the sea lice treatment station, determining, from the image, a location of the sea louse in the sea lice treatment station, and generating, by the ultrasonic transducers and based on the propagation parameters and the location of the sea louse in the sea lice treatment station, a third set of ultrasonic signals that focuses energy at the sea louse.

A second innovative aspect of the subject matter described in this specification is embodied in a method that includes generating, by ultrasonic transducers distributed in a sea lice treatment station, a first set of ultrasonic signals, detecting, by the ultrasonic transducers, a second set of ultrasonic signals in response to propagation of the first set of ultrasonic signals through water in the sea lice treatment station, determining propagation parameters of the sea lice treatment station based on the second set of ultrasonic signals that were detected, and storing the propagation parameters for later treatment of sea lice.

A third innovative aspect of the subject matter described in this specification is embodied in a method that includes obtaining an image of a sea louse on a fish in a sea lice treatment station, determining, from the image, a location of the sea louse in the sea lice treatment station, accessing propagation parameters of the sea lice treatment station from storage of the sea lice treatment station, and generating, by ultrasonic transducers of the sea lice treatment station and based on the propagation parameters and the location of the sea louse in the sea lice treatment station, a third set of ultrasonic signals that focuses energy at the sea louse.

A fourth innovative aspect of the subject matter described in this specification is embodied in a method that includes generating, by ultrasonic transducers distributed in a ectoparasite treatment station, a first set of ultrasonic signals, detecting, by the ultrasonic transducers, a second set of ultrasonic signals in response to propagation of the first set of ultrasonic signals through water in the ectoparasite treatment station, determining propagation parameters of the ectoparasite treatment station based on the second set of ultrasonic signals that were detected, obtaining an image of an ectoparasite on a fish in the ectoparasite treatment station, determining, from the image, a location of the ectoparasite in the ectoparasite treatment station, and generating, by the ultrasonic transducers and based on the propagation parameters and the location of the ectoparasite in the ectoparasite treatment station, a third set of ultrasonic signals that focuses energy at the ectoparasite.

Other implementations of this and other aspects include corresponding systems, apparatus, and computer programs, may be configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The foregoing and other embodiments can each optionally include one or more of the following features, alone or in combination. For instance, in some aspects generating a third set of ultrasonic signals that focuses energy at the sea louse includes determining, from the image, that a portion of the fish is not between a particular ultrasonic transducer and the sea louse and based on determining, from the image, that the portion of the fish is not between the particular ultrasonic transducer and the sea louse, generating an ultrasonic signal of the third set of ultrasonic signals with the particular ultrasonic transducer. In certain aspects, generating a third set of ultrasonic signals that focuses energy at the sea louse includes determining, from the image, that a portion of the fish is between a particular ultrasonic transducer and the sea louse and based on determining, from the image, that the portion of the fish is not between the particular ultrasonic transducer and the sea louse, determining not to generate an ultrasonic signal with the particular ultrasonic transducer.

In some implementations, detecting, by the ultrasonic transducers, a second set of ultrasonic signals in response to propagation of the first set of ultrasonic signals through water in the sea lice treatment station includes detecting, by a first ultrasonic transducer, ultrasonic signals in response to propagation of a first ultrasonic signal that was generated by a second ultrasonic transducer and detecting, by the first ultrasonic transducer, ultrasonic signals in response to propagation of a second ultrasonic signal that was generated by a third ultrasonic transducer after the first ultrasonic signal was generated. In some aspects, determining propagation parameters of the sea lice treatment station based on the second set of ultrasonic signals that were detected includes determining at least one of: width of ultrasonic signals of the second set of ultrasonic signals, time offsets between detections of the second set of ultrasonic signals and generation of the first set of ultrasonic signals, or reflections of the first set of ultrasonic signals.

In certain aspects, actions include obtaining sensor data from at least one of a water temperature sensor, a water pressure sensor, or a water salinity sensor, where determining propagation parameters of the sea lice treatment station is based on the sensor data and the second set of ultrasonic signals that were detected. In some implementations, generating, by the ultrasonic transducers and based on the propagation parameters and the location of the sea louse in the sea lice treatment station, a third set of ultrasonic signals that focuses energy at the sea louse includes determining phases of continuous wave ultrasonic signals in the third set of ultrasonic signals. In some aspects, generating, by the ultrasonic transducers and based on the propagation parameters and the location of the sea louse in the sea lice treatment station a third set of ultrasonic signals that focuses energy at the sea louse, includes determining time delays of pulsed ultrasonic signals in the third set of ultrasonic signals. In some implementations, actions include determining that ultrasonic signals generated by a particular ultrasonic transducer satisfy self-cleaning criteria and based on determining that ultrasonic signals generated by the particular ultrasonic transducer satisfy self-cleaning criteria, generating, by the ultrasonic transducers, a fourth set of ultrasonic signals that focus energy at the particular ultrasonic transducer.

The above-noted aspects and implementations further described in this specification may offer several advantages. For example, the device may remove sea lice off fish with less damage to the fish than existing sea lice removal solutions. In another example, the device may reduce an amount of energy used by more efficiently directing ultrasound energy at sea lice. In yet another example, the device may increase the health of fish being raised in aquaculture environments. In still another example, the device may work in a larger range of environmental conditions (e.g., temperatures, water chemistries, station geometries, etc.).

The details of one or more embodiments of the invention are set forth in the accompanying drawings and the description below. Other features and advantages of the invention will become apparent from the description, the drawings, and the claims.

Like reference numbers and designations in the various drawings indicate like elements. The components shown here, their connections and relationships, and their functions, are meant to be exemplary only, and are not meant to limit the implementations described and/or claimed in this document.

DETAILED DESCRIPTION

Figure 1:
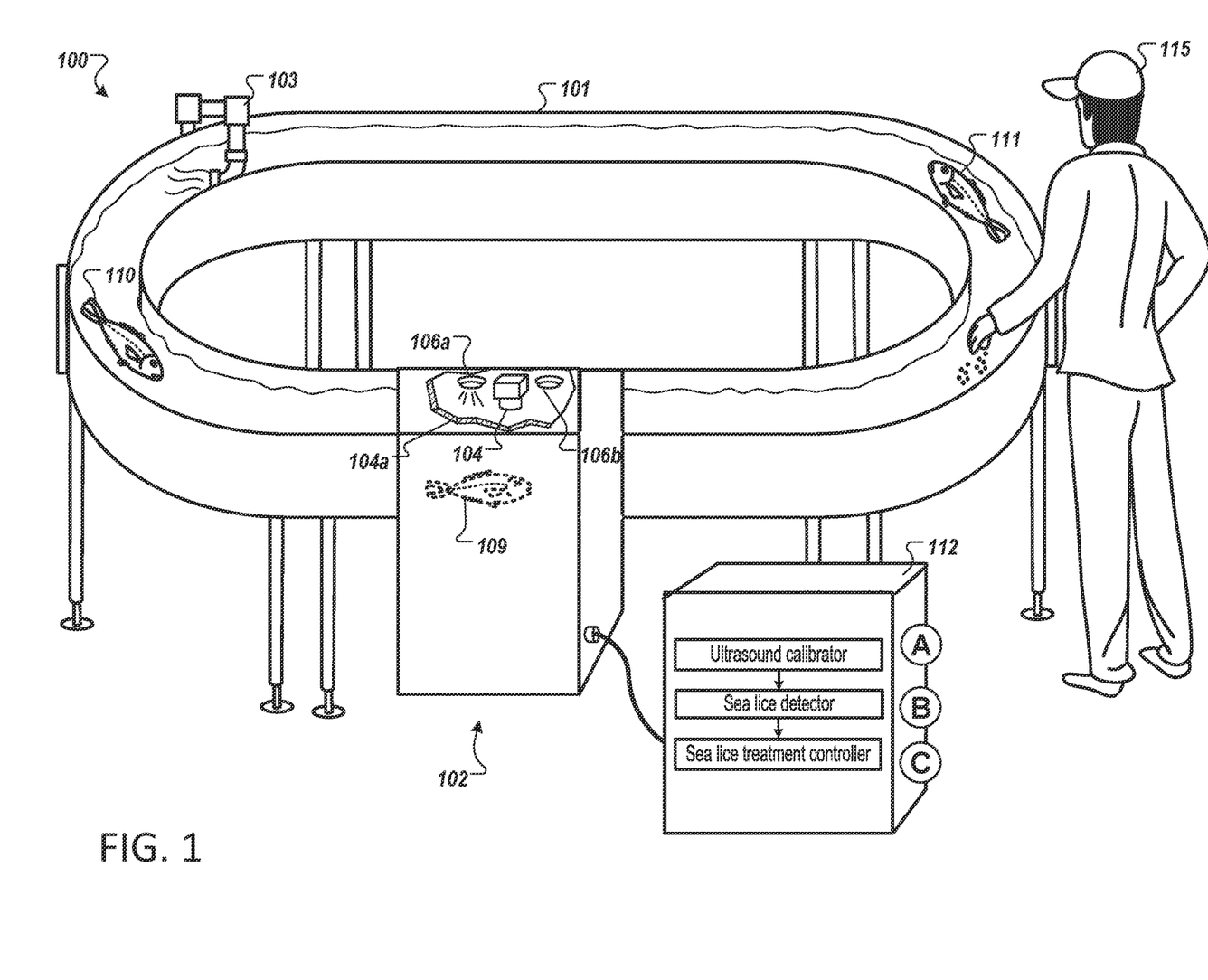
FIG. 1 is a diagram showing an example of a sea lice treatment system.

FIG. 1 is a diagram showing an example of a sea lice treatment system 100. While the sea lice treatment system 100 is described in various examples as treating sea lice, the sea lice treatment system 100 may similarly be used to treat other ectoparasites that attach to fish, as described further below. The system 100 includes a fish tank 101 and a sea lice treatment station 102 connected to the fish tank 101. A water pump 103 helps circulate the water of the fish tank 101.

A dotted outline of the first fish 109 is used to illustrate that the first fish 109 is inside the sea lice treatment station 102. An alternative view of the sea lice treatment station 102 and the fish being treated for sea lice is presented in FIGS. 2A and 2B. A second fish 110 and a third fish 111 (and perhaps other fish) swim within the fish tank 101. The fish 109 may be placed in the fish tank 101, and may be observed, by a worker 115.

A visual cutout 104d is used to show internal elements of the sea lice treatment station 102. The sea lice treatment station 102 includes a camera 104 and ultrasonic transducers 106a, 106b (collectively referred to as 106). While only two ultrasonic transducers 106 are shown in FIG. 1, the sea lice treatment station 102 may include one hundred, two hundred, or some other number of ultrasonic transducers 106.

The ultrasonic transducers 106 may generate ultrasonic signals and detect ultrasonic signals. For example, the ultrasonic transducers 106 may be ultrasonic transceivers, or a combination of ultrasonic transmitters that emit ultrasonic signals and ultrasonic receivers that sense ultrasonic signals. The camera 104 is shown between the ultrasonic transducers 106. However, the camera 104 may be before the ultrasonic transducers 106 in the direction of water flow, or after ultrasonic transducers 106. While only a single camera is shown, the sea lice treatment station 102 may include multiple cameras to detect sea lice, and may also include lights.

A control unit 112 of the system 100 interfaces with elements including the sea lice treatment station 102. The control unit 112 may include digital electronic circuitry that forms an ultrasonic calibrator, a sea lice detector, and a sea lice treatment controller. The ultrasonic calibrator may determine propagation parameters of the sea lice treatment station 102. For example, the ultrasonic calibrator may perform self-calibration for a period of five minutes every hour, once a day at a particular time, or some other frequency. Additionally or alternatively, the sea lice treatment station 102 may perform the self-calibration whenever no fish are inside the sea lice treatment station 102. For example, the sea lice treatment station 102 may continue to perform self-calibration until a fish is detected about to enter the sea lice treatment station 102 by object detection on an image from the camera 104, pause self-calibration while the fish is inside the sea lice treatment station 102, and resume self-calibration once the sea lice treatment station 102 detects that the fish has exited the sea lice treatment station 102.

Propagation parameters may reflect how ultrasonic signals propagate through water within the sea lice treatment station 102. For example, propagation parameters may specify at least one of: pulse width of ultrasonic signals sensed by the ultrasonic transducers 106, time offsets between when ultrasonic signals were generated and sensed by the ultrasonic transducers 106, reflections of ultrasonic signals within the sea lice treatment station 102, spectral width of ultrasonic signals sensed by the ultrasonic transducers 106, or phase offset.

The sea lice detector may obtain images from the camera 104 and detect sea lice on fish. For example, the sea lice detector may detect a sea louse on one side of a tail of the fish 109. The sea lice treatment controller may, based on the propagation parameters, generate ultrasonic signals that focus energy on the sea louse that was detected. For example, the sea lice treatment controllers may determine different ultrasonic signals to be generated by different ones of the ultrasonic transducers 106, where energy of the signals converges so the location with highest energy is at the sea louse.

Stages A-C of FIG. 1 depict an example of the operation of the system 100. Specifically, in stage A, before the fish 109 enters to sea lice treatment station 102, the ultrasound calibrator generates and senses ultrasonic signals by the ultrasonic transducers 106 and determines propagation parameters from the ultrasonic signals sensed. The sensed ultrasonic signals may be directly transmitted signals or reflected signals.

In stage B, the first fish 109 swims into the sea lice treatment station 102. When the fish 109 is within the field of view of the camera 104, the sea lice detector may receive images of the fish 109 and use object recognition to detect sea lice on the fish 109. For example, the sea lice detector may detect a sea louse on a tail of the fish by performing image-based object recognition on one or more images from the camera 104.

In stage C, the sea lice treatment controller may determine a set of ultrasonic signals that, when generated by the ultrasonic transducers 106, focuses energy on the location of the sea louse within the sea lice treatment station 102. For example, the sea lice treatment controller may determine to only generate ultrasonic signals on thirty of two hundred ultrasonic transducers 106, where the ultrasonic signals are different from one another and converge most energy at the location of the sea louse.

In some implementations, stages B and C may repeat until all sea lice are removed or loosened from the fish 109. For example, stages B and C may repeat once every one fifty milliseconds while the fish 109 is within the sea lice treatment station 102. In another example, stages B and C may be performed once each time the fish 109 passes through the sea lice treatment station 102. In some implementations, the energy focused on the sea louse may be increased until the sea lice detector no longer detects the sea louse on the fish or a maximum energy limit that is safe for fish is reached.

After sea lice treatment in the sea lice treatment station 102 takes place, the first fish 109 may exit the sea lice treatment station 102 and resume swimming freely within the fish tank 101. Further detections by the system 100 can take place concerning the second fish 110 after the second fish 110 swims around the fish tank 101 and into the sea lice treatment station 102. Once the second fish 110 is within the sea lice treatment station 102, the sea lice treatment station 102 can treat the second fish 110 for sea lice in a similar manner to discussed above in reference to the first fish 109.

In some implementations, the sea lice treatment system 100 may not include a camera. The sea lice treatment system 100 might be so gentle that ultrasonic signals may provide ultrasonic energy all over the fish, or the sea lice treatment system 100 might always target behind the adipose and dorsal fins where lice is most commonly found. For example, the sea lice treatment system 100 may detect the presence, location, size, and orientation of fish based on changes in ultrasonic signals sensed by the ultrasonic transducers 106 and then, without attempting to detect sea lice on the fish, transmit ultrasonic signals with the ultrasonic transducers 106 according to the propagation parameters that target a predetermined amount of ultrasonic energy at the adipose and dorsal fins.

Figure 2A:
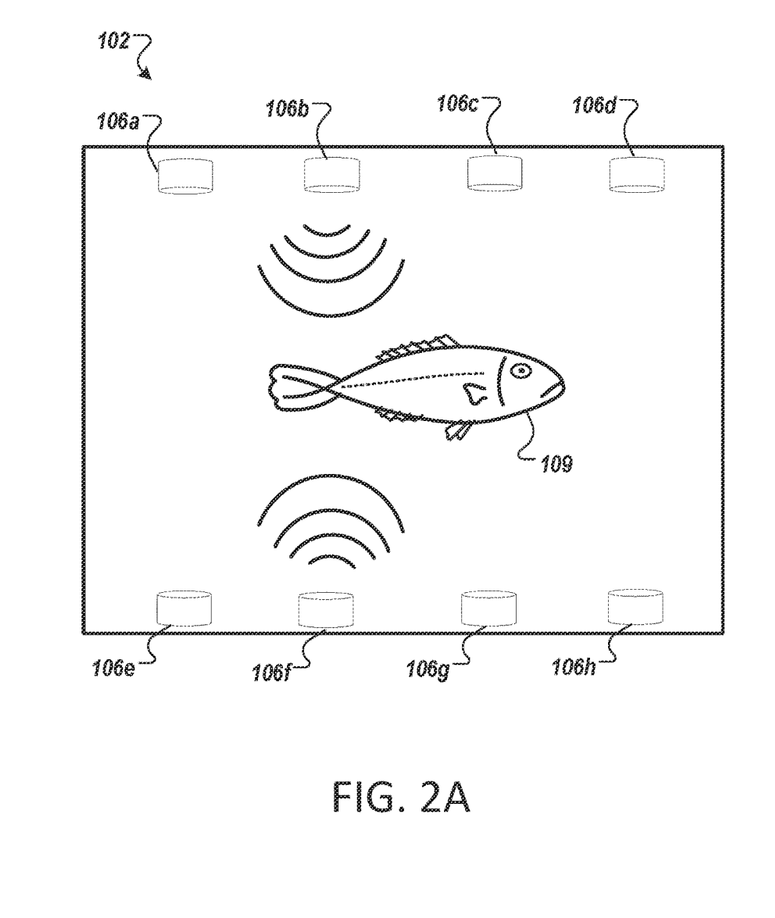
FIGS. 2A and 2B are diagrams showing an example sea lice treatment station.
Figure 2B:
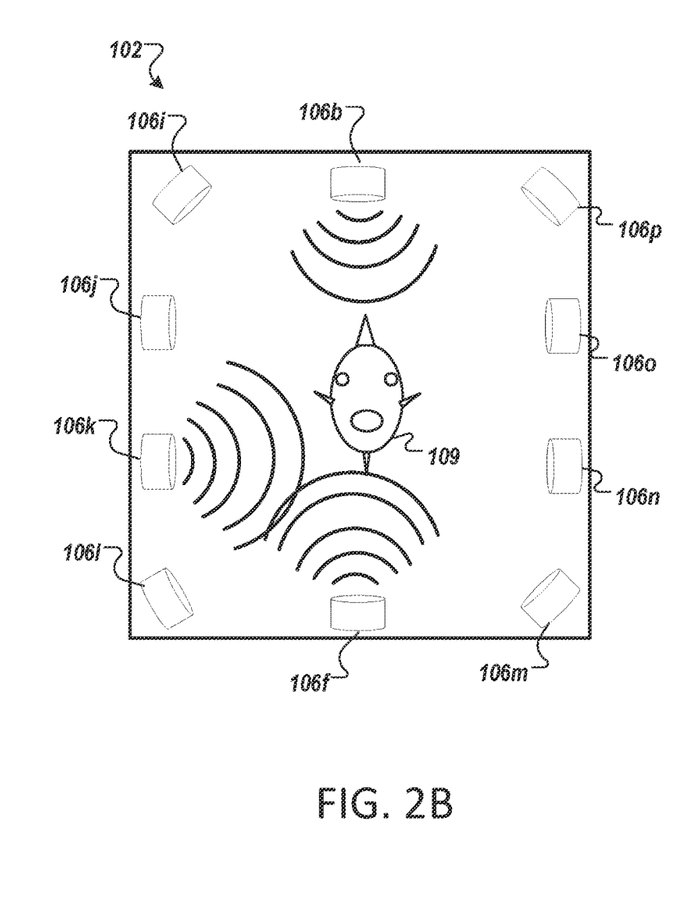

FIGS. 2A and 2B are diagrams showing an example sea lice treatment station. FIG. 2A shows a side view of the sea lice treatment station 102 and FIG. 2B shows a cross-sectional view of the sea lice treatment station 102. A shown in FIG. 2A, the sea lice treatment station 102 may include ultrasonic transducers 106a-106h distributed along the top and bottom of the sea lice treatment station 102. FIG. 2B shows that the ultrasonic transducers 106b, 106f, and 106i-106p may be distributed along four walls of the sea lice treatment station 102. However, the sea lice treatment station 102 may have other geometries. For example, the sea lice treatment station may be cylindrical with ultrasonic transducers distributed along a single inner wall or shaped as an octagon with ultrasonic transducers distributed along eight walls.

For example, for a sea louse located on the left of the fish as shown in FIG. 2B, the sea lice treatment controller may receive x, y, z coordinates of the sea louse in the sea lice treatment station 102 from the sea lice detector, determine a position of the fish 109 based on images from the camera 104, and determine a particular combination of ultrasonic signals to be generated by only ultrasonic transducers 106b, 106f, and 106k.

The sea lice treatment controller may determine the ultrasonic signals to generate based on obtaining stored propagation parameters for each of the ultrasonic transducers 106a-106p and calculating a combination of ultrasonic signals to be generated by the ultrasonic transducers that increases ultrasonic energy at the location of the sea louse relative to other locations in the sea lice treatment station 102, especially where the fish is located.

For example, the sea lice treatment controller may determine to generate particular ultrasonic signals at only ultrasonic transducers 106b, 106f, and 106k. The determination may be based on determining that according to the propagation parameters for all of the ultrasonic transducers 106a-106p that the combination of the particular ultrasonic signals are expected to propagate to focus more energy at the sea louse, while maintaining a safe amount of energy at the fish, than any other combination of ultrasonic signals.

As mentioned in FIG. 1, the propagation parameters for the ultrasonic transducers 106a-106p may be determined during a periodic calibration before the fish 109 enters the sea lice treatment station 102. For example, the ultrasonic calibrator may, for each of the ultrasonic transducers 106a-106p, iteratively generate ultrasonic signals at different frequencies, pulse duration, signal duration, and amplitudes, and detect the ultrasonic signals at the other transducers to determine propagation parameters for the ultrasonic transducer that transmitted the ultrasonic signals. The determination of propagation parameters and calculation of ultrasonic signals based on the propagation parameters is discussed in more detail below in regards in FIG. 4.

While FIG. 2A only shows two ultrasonic transducers transmitting and FIG. 2B only shows three ultrasonic transducers transmitting, in some other examples, five, ten, fifteen, fifty, one hundred, three hundred, or some other number of hundreds of transducers may simultaneously transmit ultrasonic signals.

Figure 3:
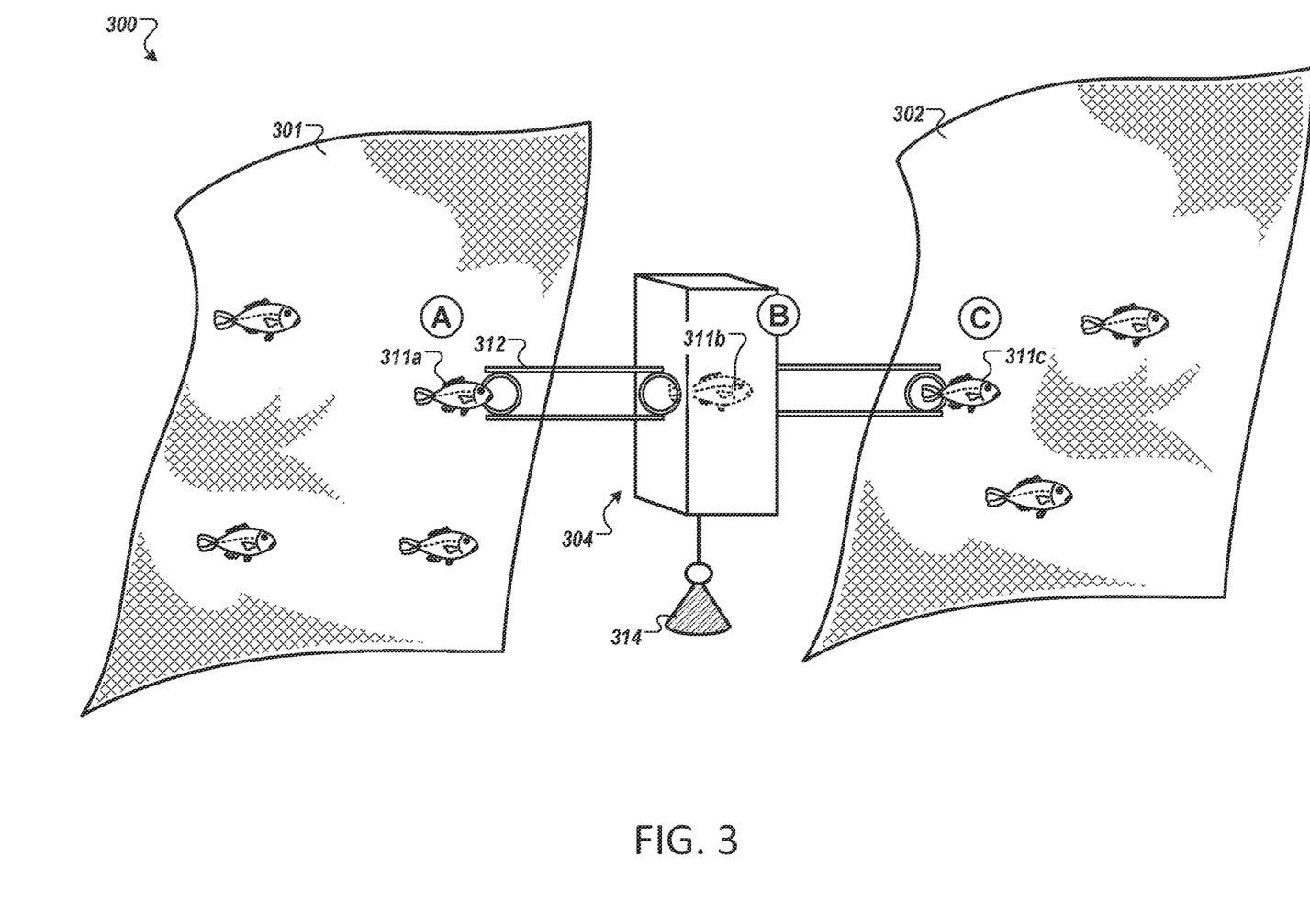
FIG. 3 is a diagram showing an example of a sea lice treatment system.

FIG. 3 is a diagram showing an example of a sea lice treatment system 300. The system 300 is shown in an open water environment. Nets 301 and 302 are used in this implementation to direct fish into a sea lice treatment station 304. The system 300 includes the nets 301 and 302, the sea lice treatment station 304, a fish 311 (shown in three stages as 311a, 311b and 311c), a tube 312 feeding into the sea lice treatment station 304, and a weight 314 that provides stability to the sea lice treatment station 304.

The sea lice treatment station 304 is another implementation of the sea lice treatment station 102 shown in FIG. 1 and FIGS. 2A and 2B. The sea lice treatment station 304 similarly includes a camera and ultrasonic transducers.

FIG. 3 is shown in three stages. Stage A corresponds to the fish 311a entering the tube 312. Stage B corresponds to the fish 311b within the sea lice treatment station 304 being treated for sea lice. Stage C corresponds to the fish 311c exiting the sea lice treatment station 102 through the tube 312.

Stage A of FIG. 3 shows the fish 311a entering the tube 312 from the net 301 enclosure. Other fish are within the net 301. In general, there is no limit to the number of fish able to be processed by the sea lice treatment station 304.

Stage B of FIG. 3 shows the fish 311b within the sea lice treatment station 304 being treated for sea lice. The fish 311b is a representation of the fish 311a shown at a later time in a different location. The sea lice treatment station 304 uses a control unit similar to the control unit 112 of FIG. 1 to calibrate ultrasonic signals, detect sea lice, and treat for sea lice.

Stage C of FIG. 3 shows the fish 311c exiting the sea lice treatment station 102 through the tube 312. An incentive can be used to move the fish from the tube 312 to the net 302. Depending on implementation, the incentive can include food or physical forces such as water currents.

In some implementations, the sea lice treatment system 300 can be floating within a body of water. For example, the sea lice treatment system 300 can be submerged within a body of water containing one or more fish. The one or more fish contained within the body of water may be processed by the sea lice treatment system 300.

Figure 4:
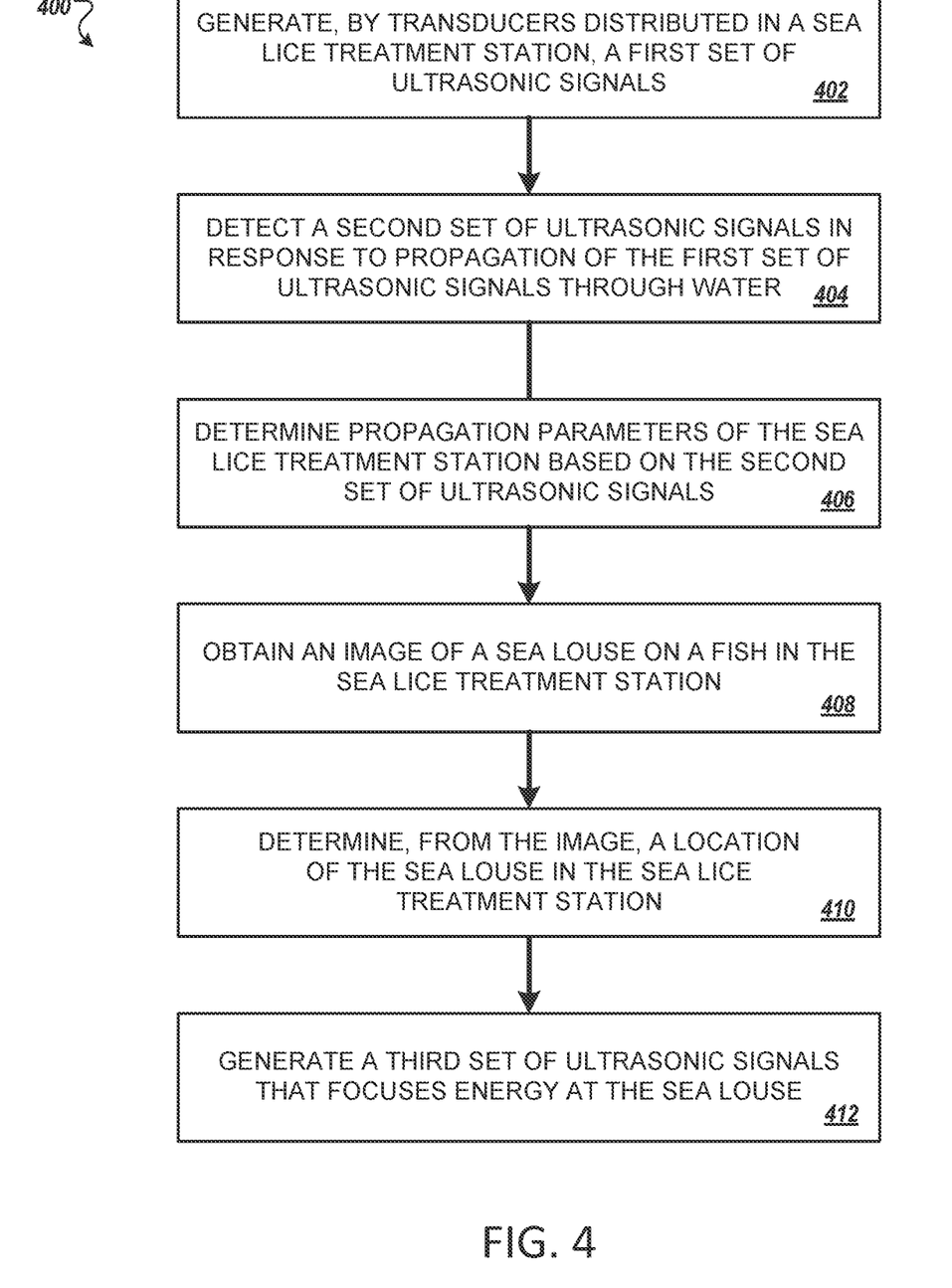
FIG. 4 is a flow diagram illustrating an example of a process for self-calibrating ultrasonic removal of sea lice.

FIG. 4 is a flow diagram illustrating an example of a process 400 for self-calibrating ultrasonic removal of sea lice. Briefly, and as will be described in more detail below, the process 400 includes generating, by transducers distributed in a sea lice treatment station, a first set of ultrasonic signals, detecting a second set of ultrasonic signals in response to propagation of the first set of ultrasonic signals through water, determining propagation parameters of the sea lice treatment station based on the second set of ultrasonic signals that were detected, obtaining an image of a sea louse on a fish in the sea lice treatment station, determining, from the image, a location of the sea louse in the sea lice treatment station, and generating a third set of ultrasonic signals that focuses energy at the sea louse.

The process 400 includes generating, by transducers distributed in a sea lice treatment station, a first set of ultrasonic signals (402). For example, the ultrasound calibrator may control the ultrasonic transducers 106 to generate ultrasonic signals.

The process 400 includes detecting a second set of ultrasonic signals in response to propagation of the first set of ultrasonic signals through water (404). For example, the ultrasound calibrator may control the ultrasonic transducers 106 to detect for ultrasonic signals.

In some implementations, detecting, by the ultrasonic transducers, a second set of ultrasonic signals in response to propagation of the first set of ultrasonic signals through water includes detecting, by a first ultrasonic transducer, ultrasonic signals in response to propagation of a first ultrasonic signal that was generated by a second ultrasonic transducer and detecting, by the first ultrasonic transducer, ultrasonic signals in response to propagation of a second ultrasonic signal that was generated by a third ultrasonic transducer after the first ultrasonic signal was generated. For example, while calibrating, the ultrasound calibrator may generate an ultrasonic signal with one of the ultrasonic transducers 106, detect for the ultrasonic signal at all of the ultrasonic transducers 106, and then repeat both steps for each of the ultrasonic transducers 106.

In some implementations, instead of generating ultrasonic signals sequentially during calibration as described above, the ultrasound calibrator may generate ultrasonic signals in parallel. For example, the ultrasound calibrator may use the standing wave approach and use variable coded phase shifts to differentiate which signals are coming from which transducers without needing to run one at a time. If using the pulsed approach, the ultrasound calibrator may use a similar encoding technique such as pulse width modulation or pulse density modulation that differentiates each transmitter so receivers can tell them apart.

The process 400 includes determining propagation parameters of the sea lice treatment station based on the second set of ultrasonic signals that were detected (406). For example, the ultrasound calibrator may determine propagation parameters of the sea lice treatment station 102 based on what ultrasonic signals were generated at the ultrasonic transducers 106 and resultant ultrasonic signals detected at the ultrasonic transducers 106.

In some implementations, determining propagation parameters of the sea lice treatment station based on the second set of ultrasonic signals that were detected includes determining at least one of pulse width of ultrasonic signals of the second set of ultrasonic signals, time offsets between detections of the second set of ultrasonic signals and generation of the first set of ultrasonic signals, spectral width, phase offset, or reflections of the first set of ultrasonic signals. For example, the ultrasound calibrator may determine the milliseconds between when an ultrasonic signal is generated at a first transducer and the ultrasonic signal is detected at a second transducer. In some implementations, determining propagation parameters may include determining precise transducer locations.

The process 400 includes obtaining an image of a sea louse on a fish in the sea lice treatment station (408). For example, the sea lice detector may receive an image captured by the camera 104, where the image shows the fish 109 inside the sea lice treatment station 102.

The process 400 includes determining, from the image, a location of the sea louse in the sea lice treatment station (410). For example, the sea lice detector may use object recognition to detect a sea louse on a tail of the fish 109, where the sea louse is detected to be in an exact middle of the water containing portion of the sea lice treatment station 102.

The process 400 includes generating a third set of ultrasonic signals that focuses energy at the sea louse (412). For example, the sea lice treatment controller may control the ultrasonic transducers 160 to generate ultrasonic signals that focus energy at the exact middle of the water in the sea lice treatment station 102.

In some implementations, generating a third set of ultrasonic signals that focuses energy at the sea louse includes determining, from the image, that a portion of the fish is not between a particular ultrasonic transducer and the sea louse, generating an ultrasonic signal of the third set of ultrasonic signals with the particular ultrasonic transducer. For example, from the perspective shown in FIG. 2A, the sea lice detector may determine that a sea lice is on the left side of the fish 109 which is directly in line of sight of the ultrasonic transducer 106k and, in response, determine to use the ultrasonic transducer 106k to generate one of the ultrasonic signals in the set of ultrasonic signals used to remove a sea louse.

In some implementations, generating a third set of ultrasonic signals that focuses energy at the sea louse includes determining, from the image, that a portion of the fish is between a particular ultrasonic transducer and the sea louse and based on determining, from the image, that the portion of the fish is between the particular ultrasonic transducer and the sea louse, determining not to generate an ultrasonic signal with the particular ultrasonic transducer. For example, the perspective shown in FIG. 2A, the sea lice detector may determine that a sea lice is on a left side of the fish 109 which is blocked from line of sight of the ultrasonic transducer 106n by the fish 109 and, in response, determine not to use the ultrasonic transducer 106n to generate any of the ultrasonic signals in the set of ultrasonic signals used to remove a sea louse.

In some implementations, generating, by the ultrasonic transducers and based on the propagation parameters and the location of the sea louse in the sea lice treatment station, a third set of ultrasonic signals that focuses energy at the sea louse includes determining phases of continuous wave ultrasonic signals in the third set of ultrasonic signals. For example, the ultrasonic signals may be continuous waves which vary in phase and period.

In some implementations, the process 400 includes generating, by the ultrasonic transducers and based on the propagation parameters and the location of the sea louse in the sea lice treatment station a third set of ultrasonic signals that focuses energy at the sea louse, includes determining time delays of pulsed ultrasonic signals in the third set of ultrasonic signals. For example, the ultrasonic signals may be pulses sent with different time delays.

In some implementations, the process 400 includes obtaining sensor data from at least one of a water temperature sensor, a water pressure sensor, or a water salinity sensor, where determining propagation parameters of the sea lice treatment station is based on the sensor data and the second set of ultrasonic signals that were detected. For example, the ultrasound calibrator may use a current water temperature of 70° F. sensed by chemical properties of a thermometer to determine propagation parameters for other temperatures of water.

In some implementations, the process 400 includes determining that ultrasonic signals generated by a particular ultrasonic transducer satisfy self-cleaning criteria, and based on determining that ultrasonic signals generated by the particular ultrasonic transducer satisfy self-cleaning criteria, generating, by the ultrasonic transducers, a fourth set of ultrasonic signals that focus energy at the particular ultrasonic transducer. For example, the ultrasonic calibrator may determine that ultrasonic signals emitted by a particular transducer are sensed by other transducers as weaker than typical and, in response, determine that dirt, bio-foul, growth, or some other substance on the particular transducer might be interfering with signals from the particular transducer so direct energy at the particular transducer to attempt to remove dirt. In another example, the sea lice detector may visually determine that a particular transducer looks dirty in an image and, in response, direct energy at the particular transducer to attempt to remove dirt.

Figure 5:
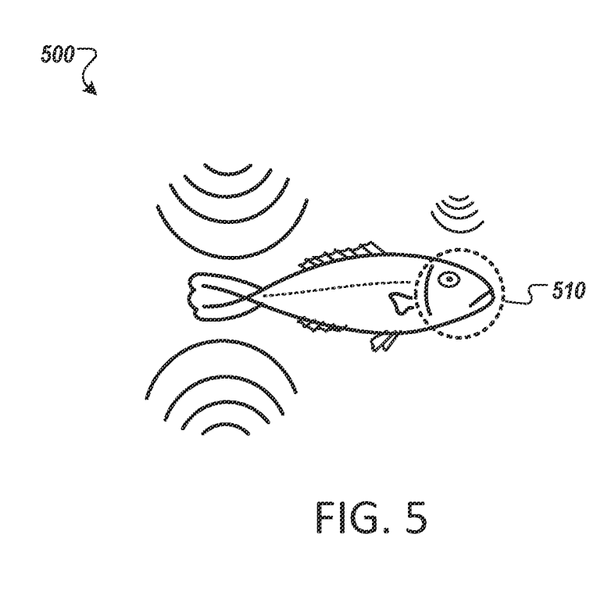
FIG. 5 is a diagram showing a sensitive area around an eye and gills of fish.

In some implementations, the process 400 includes determining that the sea louse is located near a particular part of a fish and determining ultrasonic signals accordingly. For example, the sea lice treatment controller may determine that the sea louse is within one centimeter of an eye of a fish or gills and, in response, determine not to generate ultrasonic signals to remove the sea louse to protect the sensitive eye or gills area. FIG. 5 is a diagram 500 showing a sensitive area 510 around an eye and gills of fish.

In another example, the sea lice treatment controller may determine that the sea louse is on a dorsal fin and, in response, determine to target the maximum energy limit that is safe for fish at the sea louse. For example, tough skin on the fish's spine may withstand stronger pressures from the ultrasonic transducers than more sensitive portions, near gills or eyes for example, which may require gentler pressures.

In some implementations, the process 400 includes determining that another fish is located between the sea louse and an ultrasonic transducer. For example, the sea lice treatment controller may determine from an image captured by the camera 104 that a second fish is between the ultrasonic transducer 106k and the sea louse on a first fish and, in response, determine to generate a set of ultrasonic signals that focuses energy at the sea louse without transmitting from the ultrasonic transducer 106k as signals from the ultrasonic transducer 106k are expected to be blocked by the second fish. In another example, the sea lice treatment controller may determine from an image captured by the camera 104 that no other fish is between the ultrasonic transducer 106k and the sea louse on a first fish and, in response, determine that ultrasonic signals may be generated by ultrasonic transducer 106k as ultrasonic signals generated by the ultrasonic transducer 106k are not expected to be blocked by any other fish.

In some implementations, the process 400 includes determining that another fish is located in a particular location and, in response, determining to generate ultrasonic signals that do not generate a side lobe where ultrasonic energy is focused at the particular location. For example, the sea lice treatment controller may determine from an image captured by the camera 104 that a second fish is in a corner of the sea lice treatment station 102 and, in response, determine to generate ultrasonic signals that keep ultrasonic energy at the corner below an energy threshold while focusing energy on a sea louse attached to a first fish.

In some implementations, a second process for self-calibrating ultrasonic removal of sea lice may, similarly to process 400, generate a first set of ultrasonic signals, detect a second set of ultrasonic signals, and determine propagation parameters. The second process may then store the propagation parameters for later treatment of sea lice. For example, the sea lice treatment station 102 may perform the second process during stage A, and then store the propagation parameters.

A third process for self-calibrating ultrasonic removal of sea lice may, similarly to process 400, obtain an image of a sea louse and determine a location of the sea louse. The third process may then access propagation parameters previously stored. For example, the sea lice treatment station 102 may receive and store propagation parameters determined from some other device, and later access the propagation parameters from storage. The third process may continue with similarly generating a set of ultrasonic signals that focuses energy at the sea louse.

In some implementations, a fourth process for self-calibrating ultrasonic removal of sea lice may not focus energy at a detected sea louse. For example, similarly to process 400, the fourth process may generate a first set of ultrasonic signals, detect a second set of ultrasonic signals, and determine propagation parameters. However, instead of obtaining an image of a sea louse, the fourth process may instead detect the presence, location, size, and orientation of fish based on changes in ultrasonic signals sensed by the ultrasonic transducers 106 and then, without attempting to detect sea lice on the fish, transmit ultrasonic signals with the ultrasonic transducers 106 according to the propagation parameters that target a predetermined amount of ultrasonic energy at the adipose and dorsal fins.

In some implementations, the detection of sea lice can include specific species or stages of sea lice. For example, the several species of sea lice may include ectoparasitic copepods of the genera *Lepeophtheirus* and *Caligus*. The type of fish being analyzed can affect the process of sea lice detection. For example, upon detection of a salmon, a system can adapt a system of detection for the detection of *Lepeophtheirus salmonis*—a species of sea lice which can be especially problematic for salmon. In some implementations, a detection of a specific species of sea lice can be separated from other sea lice detections. For example, detection of *Lepeophtheirus salmonis* can be treated separately from detections of *Caligus curtis* and *Lepeophtheirus hippoglossi*.

While implementations are described above in the context of sea lice removal on salmon, self-calibrating ultrasonic removal may also be used to remove sea lice from other fish, or other ectoparasites from fish. For example, the sea lice treatment station 102 may remove sea lice from sea trout or three-spined stickleback, or remove *Benedenia seriolae*, an ectoparasitic flatworm that suctions onto yellowtail fish. Accordingly, the sea lice treatment system 100 may also be referred to as an ectoparasite treatment system, the sea lice detector may also be referred to as an ectoparasite detector, the sea lice treatment controller may also be referred to as an ectoparasite treatment controller, and references to sea lice and sea louse described above in regards to FIG. 4 and the first through fourth processes may be replaced with references to ectoparasites other than sea lice or more generally ectoparasites.

A number of implementations have been described. Nevertheless, it will be understood that various modifications may be made without departing from the spirit and scope of the disclosure. For example, various forms of the flows shown above may be used, with steps re-ordered, added, or removed.

Embodiments of the invention and all of the functional operations described in this specification can be implemented in digital electronic circuitry, or in computer software, firmware, or hardware, including the structures disclosed in this specification and their structural equivalents, or in combinations of one or more of them. Embodiments of the invention can be implemented as one or more computer program products, e.g., one or more modules of computer program instructions encoded on a computer readable medium for execution by, or to control the operation of, data processing apparatus. The computer readable medium can be a machine-readable storage device, a machine-readable storage substrate, a memory device, a composition of matter affecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the invention can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the invention can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the invention, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the invention have been described. Other embodiments are within the scope of the following claims. For example, the steps recited in the claims can be performed in a different order and still achieve desirable results.

What is claimed is:

1. A computer-implemented method, comprising:
generating, by ultrasonic transducers distributed in a sea lice treatment station, a first set of ultrasonic signals;
detecting, using the ultrasonic transducers, a second set of ultrasonic signals in response to propagation of the first set of ultrasonic signals through water in the sea lice treatment station;
determining propagation parameters of the sea lice treatment station based on the second set of ultrasonic signals that were detected; and
generating a third set of ultrasonic signals that focus energy at a sea louse, wherein the third set of ultrasonic signals are determined based on the propagation parameters.

2. The computer-implemented method of claim 1, comprising:
determining a location of the sea louse;
determining, using the propagation parameters, an energy limit for the location of the sea louse and
generating the third set of ultrasonic signals based on the propagation parameters that include the energy limit for the location of the sea louse.

3. The method of claim 2 wherein determining, the energy limit for the location of the sea louse, comprises:
determining whether the location of the sea louse is on a particular portion of a fish, where different portions of the fish correspond to different energy limits.

4. The method of claim 1 comprising:
   determining that at least one obstruction exists between the ultrasonic transducers and the sea louse; and
   in response to determining that at least one obstruction exists between the ultrasonic transducers and the sea louse, altering the propagation parameters.

5. The method of claim 4, wherein altering the propagation parameters comprises focusing energy of the third set of ultrasonic signals at the sea louse at a reduced power level.

6. The method of claim 1 comprising:
   altering the propagation parameters of the ultrasonic signals; and:
   generating ultrasonic signals that do not generate a side lobe, where ultrasonic energy is focused at a location.

7. The method of claim 1 comprising:
   detecting, using the ultrasonic transducers and the first set of ultrasonic signals, an orientation of a fish; and
   generating, by the ultrasonic transducers and using the orientation of the fish, a set of ultrasonic signals that focuses energy at adipose and dorsal fins of the fish.

8. A system comprising one or more computers and one or more storage devices on which are stored instructions that are operable, when executed by the one or more computers, to cause the one or more computers to perform operations comprising:
   generating, by ultrasonic transducers distributed in a sea lice treatment station, a first set of ultrasonic signals;
   detecting, using the ultrasonic transducers, a second set of ultrasonic signals in response to propagation of the first set of ultrasonic signals through water in the sea lice treatment station;
   determining propagation parameters of the sea lice treatment station based on the second set of ultrasonic signals that were detected; and
   generating a third set of ultrasonic signals that focus energy at the sea a sea louse, wherein the third set of ultrasonic signals are determined based on the propagation parameters.

9. The system of claim 8, the operations comprising:
   determining a location of the sea louse;
   determining, using stored propagation parameters, an energy limit for the location of the sea louse; and
   generating the third set of ultrasonic signals based on the propagation parameters that include the energy limit for the location of the sea louse.

10. The system of claim 9 wherein determining, using stored propagation parameters, an energy limit for the location of the sea louse, comprises:
    determining whether the location of the sea louse is on a particular portion of a fish, where different portions of the fish have different energy limits.

11. The system of claim 8, the operations comprising:
    determining whether obstructions exist between the ultrasonic transducers and the sea louse; and
    in response to determining whether obstructions exist between the ultrasonic transducers and the sea louse, altering the propagation parameters, so that a set of ultrasonic signals focuses energy at the sea louse.

12. The system of claim 11, the operations comprising:
    in response to determining whether obstructions exist between the ultrasonic transducers and the sea louse, altering the propagation parameters, so that the set of ultrasonic signals focuses energy at the sea louse at a reduced power level.

13. The system of claim 8, the operations comprising:
    altering the propagation parameters of the ultrasonic signals; and:
    generating ultrasonic signals that do not generate a side lobe, where ultrasonic energy is focused at a location.

14. The system of claim 8, the operations comprising:
    detecting, using the ultrasonic transducers and the first set of ultrasonic signals, an orientation of a fish; and
    generating, by the ultrasonic transducers and using the orientation of the fish, a set of ultrasonic signals that focuses energy at adipose and dorsal fins of the fish.

15. One or more non-transitory computer storage media encoded with instructions that, when executed by one or more computers, cause the one or more computers to perform operations comprising:
    generating, by ultrasonic transducers distributed in a sea lice treatment station, a first set of ultrasonic signals;
    detecting, using the ultrasonic transducers, a second set of ultrasonic signals in response to propagation of the first set of ultrasonic signals through water in the sea lice treatment station;
    determining propagation parameters of the sea lice treatment station based on the second set of ultrasonic signals that were detected; and
    generating a third set of ultrasonic signals that focus energy at a sea louse, wherein the third set of ultrasonic signals are determined based on the propagation parameters.

16. The computer storage media of claim 15, the operations comprising:
    determining a location of the sea louse;
    determining, using stored propagation parameters, an energy limit for the location of the sea louse; and
    generating the third set of ultrasonic signals based on the propagation parameters that include the energy limit for the location of the sea louse.

17. The computer storage media of claim 16, wherein determining, using stored propagation parameters, an energy limit for the location of the sea louse, comprises:
    determining whether the location of the sea louse is on a particular portion of a fish, where different portions of the fish have different energy limits.

18. The computer storage media of claim 15, the operations comprising:
    determining whether obstructions exist between the ultrasonic transducers and the sea louse; and
    in response to determining whether obstructions exist between the ultrasonic transducers and the sea louse, altering the propagation parameters, so that a set of ultrasonic signals focuses energy at the sea louse.

19. The computer storage media of claim 18, the operations comprising:
    in response to determining whether obstructions exist between the ultrasonic transducers and the sea louse, altering the propagation parameters, so that the set of ultrasonic signals focuses energy at the sea louse at a reduced power level.

20. The computer storage media of claim 15, the operations comprising:
    altering the propagation parameters of the ultrasonic signals; and:
    generating ultrasonic signals that do not generate a side lobe, where ultrasonic energy is focused at a location.

* * * * *